Jan. 5, 1954 D. WIGHT, JR 2,665,021
ATTACHMENT LOCK FOR INDUSTRIAL TRUCKS
Filed Sept. 12, 1950 2 Sheets-Sheet 1

INVENTOR.
DELANO WIGHT JR.
BY
ATTYS.

Jan. 5, 1954     D. WIGHT, JR     2,665,021
ATTACHMENT LOCK FOR INDUSTRIAL TRUCKS
Filed Sept. 12, 1950     2 Sheets-Sheet 2
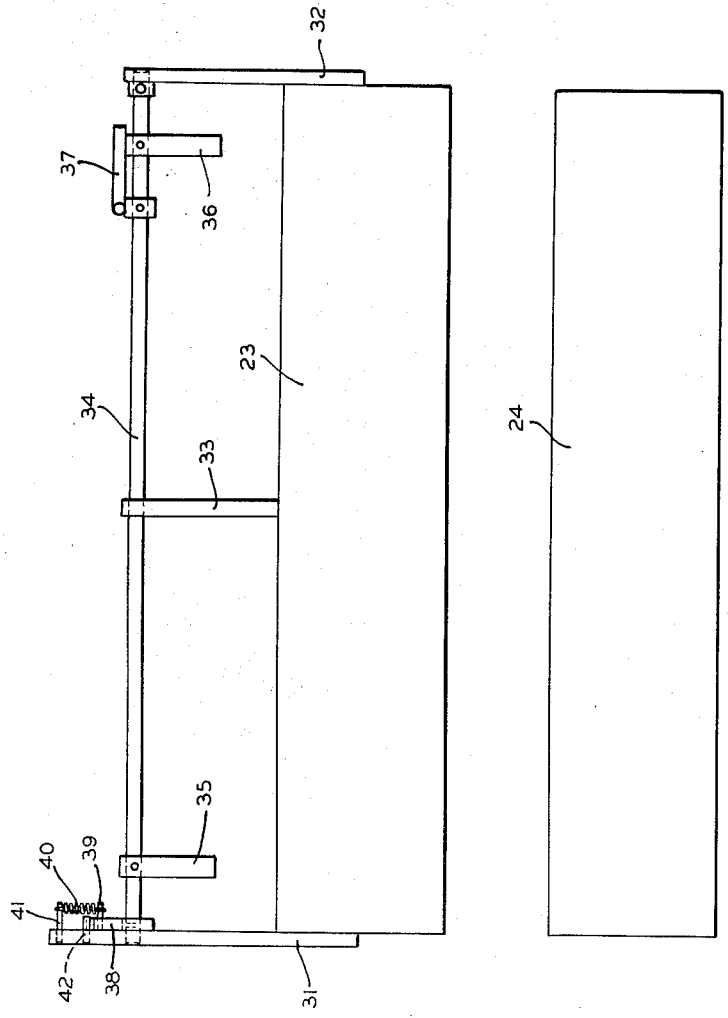
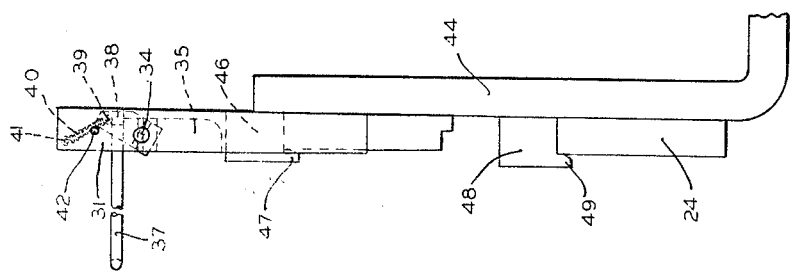
*INVENTOR.*
DELANO WIGHT JR.
BY
ATTYS.

Patented Jan. 5, 1954

2,665,021

UNITED STATES PATENT OFFICE 2,665,021

ATTACHMENT LOCK FOR INDUSTRIAL TRUCKS

Delano Wight, Jr., Battle Creek, Mich., assignor to Clark Equipment Company, Buchanan, Mich., a corporation of Michigan Application September 12, 1950, Serial No. 184,381

5 Claims. (Cl. 214—620)

My invention relates generally to industrial trucks, and, more specifically, is directed to a mechanism for locking load engaging devices to the load supporting carriage of an industrial truck.

At the present time, in the material handling field, it is the general practice to secure load engaging devices to the load supporting carriage of an industrial truck by means of bolts. Thus, where several forms of load engaging devices are to be used interchangeably with a single industrial truck, considerable time is consumed, by a worker, in first removing the bolts which secure one device to the load supporting carriage and then in fastening the bolts used in mounting another device to the load supporting carriage.

It is an object of my present invention to provide a mechanism for self-locking load engaging devices to the load supporting carriage of an industrial truck.

It is another object of my present invention to provide a mechanism, of the character noted, which may be rendered inoperative manually by an operator of the industrial truck from the operator's seat.

I propose to accomplish the aforementioned objects, in a preferred form of my invention, by mounting a frame member to the load supporting carriage of an industrial truck, transversely thereof. Suitably secured to the ends of the frame member are vertically extending brackets in which, at the upper ends thereof, are journaled the ends of a shaft. Fixed to the shaft, adjacent the ends thereof, are the one ends of a pair of crank arms. Another crank arm is fixed at one end to the shaft and extends rearwardly therefrom toward the operator's seat of the industrial truck. Spring means are provided between the shaft and one of the brackets for normally biasing the pair of crank arms to a vertical position and the rearwardly extending crank arm to a substantially horizontal position.

The load supporting means, which is mounted to the frame member, is provided with horizontal flange members which are adapted to engage the upper edge of the frame member. The flange members are formed with depending tongue portions that are adapted to engage the rear surface of the frame member.

In using the self-locking mechanism of my present invention, the truck is maneuvered so that the flange members are substantially aligned with the upper edge of the frame member. The truck is then edged forwardly until the tongue portions of the flange members have cleared the upper edge of the frame member. During this forward movement, the forward edges of the flange members engage the lower ends of the pair of crank arms causing them to rotate toward the truck from their normal vertical position. The load supporting carriage is then raised until the upper edge of the frame member engages the lower edge of the flange members and the rear surface of the frame member engages the tongue portions. When the flange members are thus positioned, the pair of crank arms are caused to rotate back to their normal vertical position, by the spring means, with the lower ends thereof disposed in engagement with the upper edges of the flange members.

In releasing the locking mechanism of my present invention, the rearwardly extending crank arm need only be moved upwardly by the foot of the operator which causes rotation of the shaft. Rotation of the shaft causes the lower ends of the pair of crank arms to rotate away from engagement with the flange members. The load supporting carriage may then be lowered until the lip portions of the flange members are disengaged from contact with the rear surface of the frame member. The truck may then be backed away.

Now, in order to acquaint those skilled in the art with the manner of constructing and using the device of my present invention, I shall describe, in connection with the accompanying drawings, a preferred embodiment of my invention.

In the drawings:

Figure 2 is a front elevational view of the device of my present invention; and

Figure 3 is a side elevational view of the device shown in Figure 2.

Figure 1:
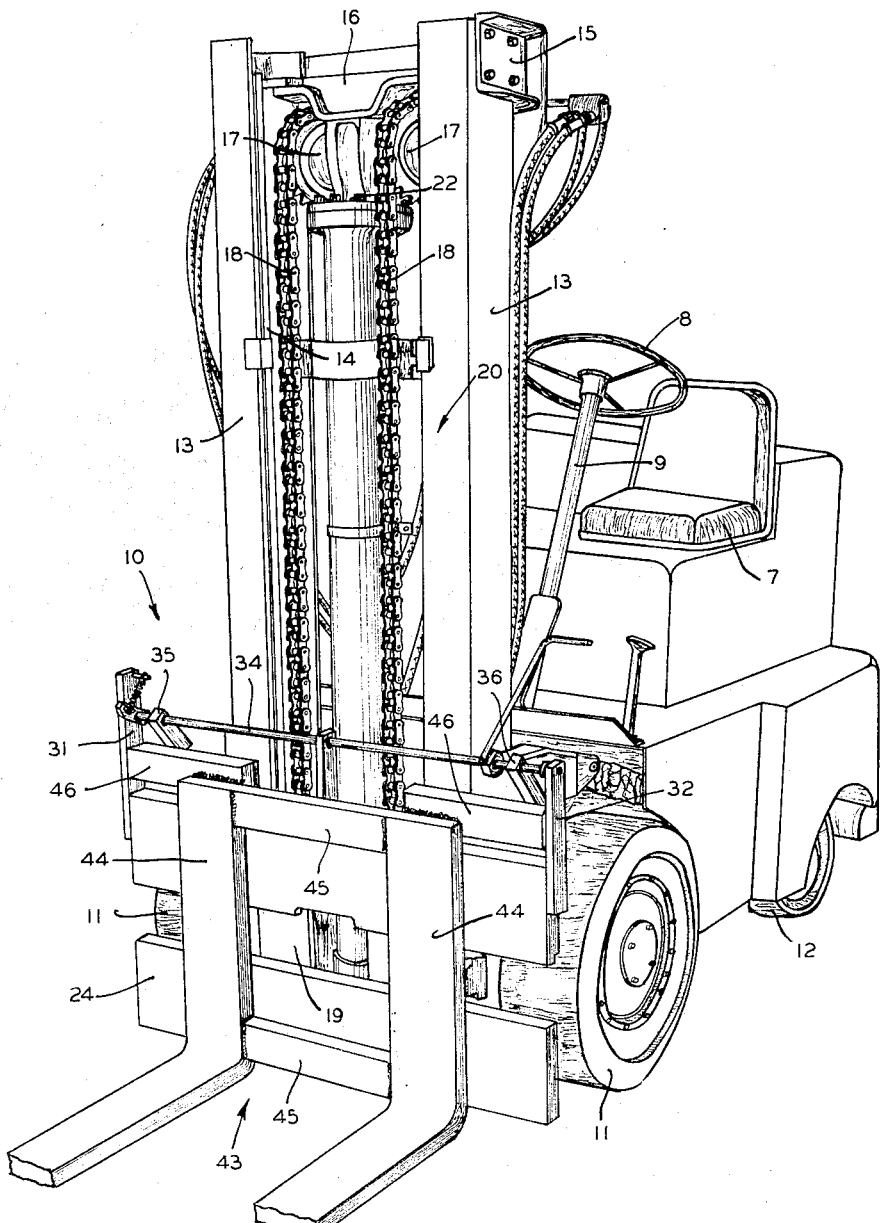
Figure 1 is a perspective view of an industrial truck to which the device of my present invention has been incorporated.

Referring now to Figure 1, there is shown an industrial truck, indicated generally by the reference numeral 10, which has a pair of drive wheels 11 disposed at the forward end thereof and a pair of steering wheels 12 disposed at the rear end thereof. A hand steering wheel 8, mounted at the upper end of a steering column 9, is operatively connected, in a known manner, to the steering wheels 12. An operator's seat 7 is mounted on the frame of the truck 10. Mounted to the frame of the industrial truck 10, adjacent the forward end thereof, is a substantially vertically extending mast which comprises a pair of fixed outer channel members 13 in which are slidably mounted a pair of inner channel members 14. The upper ends of the outer fixed channel members 13 are interconnected by a horizontal U-shaped brace member 15. The inner slidable channel members 14 are interconnected, adjacent their upper ends, by means of a crosshead 16 which carries a pair of horizontally spaced rotatable sprocket gears 17. A pair of chains 18 are trained over the sprocket gears 17 and are suitably fixed at their one ends to the outer fixed channel members 13. The other ends of the chains 18 are suitably secured to a load supporting carriage 19, which is mounted for sliding movement within the inner channel members 14. A substantially vertically extending hydraulic piston and cylinder assembly, indicated generally by the reference numeral 20, is disposed intermediate of the inner channel members 14. The hydraulic piston and cylinder assembly 20 comprises a cylinder 21 which is fixed at its lower end to the main frame of the industrial truck 10. The hydraulic piston and cylinder assembly 20 also comprises a piston rod 22, which at its outer upper end has connection to the aforementioned crosshead 16 interconnecting the inner channel members 14.

When fluid under pressure is admitted to the lower end of the cylinder 21, the piston rod 22, together with the crosshead 16 and sprocket gears 17, are extended upwardly. Upward movement of the sprocket gears 17 causes the ends of the chains 18, which are secured to the load supporting carriage 19, to be moved upwardly with the load supporting carriage 19.

Suitably secured to the forward vertical surface of the load supporting carriage 19 are a pair of vertically spaced transversely extending frame members 23 and 24. As best shown in Figures 2 and 3, a pair of vertically extending bracket members 31 and 32 are suitably secured, at their lower ends, as by welding, to the ends of the upper transverse frame member 23. Secured to the upper edge of the upper transverse frame member 23, intermediate of the ends thereof, is the lower end of a vertically extending bracket member 33. Journaled in horizontally aligned openings formed in the bracket members 31, 32, and 33 is a shaft 34. Fixed to the shaft 34, adjacent the ends thereof, are the one ends of a pair of crank arms 35 and 36. Also fixed to the shaft 34, closely adjacent the crank arm 36, is a crank arm or foot lever 37. The crank arm 37, as shown in Figure 1, is adapted to extend rearwardly toward the operator's seat 7. A lever 38 is fixed at one end to the shaft 34, adjacent bracket 31, and at its other end has a laterally projecting pin 39 secured therein. A spring 40 is fixed at its one end to the pin 39 and at its other end is fixed to a pin 41 which is mounted in an opening formed in the vertically extending bracket member 31. The spring 40 is provided for normally biasing the pair of crank arms 35 and 36 to a substantially vertical position and the rearwardly extending crank arm 37 to a substantially horizontal position. A laterally extending pin member 42 is inserted in an opening formed in the vertically extending bracket member 31 and the pin 42, at its outer end, provides a stop for the lever 38.

I shall now describe one form of load supporting means which is adapted particularly for use with the aforedescribed locking mechanism of my present invention.

The load supporting means 43 comprises a pair of horizontally spaced L-shaped fork frames 44. The upper and lower portions of the vertical legs of the fork frames 44 are interconnected by horizontal brace members 45. Suitably secured, as by welding, to the rear surfaces of the fork frames 44, adjacent the upper ends thereof, are laterally extending horizontal flange members 46 which are formed with tongue portions 47. Also secured to the rear surfaces of the vertical legs of the fork frames 44, intermediate of the ends thereof, are flange members 48 which are formed with tongue portions 49.

The lower surfaces of the flange members 46 are adapted to be disposed in engagement with the upper edges of the upper transverse frame member 23, while the tongue portions 47 of the flange members 46 are adapted to be disposed in engagement with the rear surface of the upper transverse frame member 23. The lower surfaces of the flange members 48 are adapted to be disposed in engagement with the upper edge of the lower transverse frame member 24, while the tongue portions 49 of the brackets 48 are adapted to be disposed in engagement with the rear surface of the transverse frame member 24.

I shall now describe, in connection with the drawings, the operation of the device of my present invention. When it is desired to secure load supporting means, such as that shown at 43, to the load supporting carriage 19 of the industrial truck 10, the truck is maneuvered so that the flange members 46 and 48 are substantially aligned with the upper edges of the transverse frame members 23 and 24, respectively. The truck 10 is then edged forwardly until the tongue portions 47 and 49 of the flange members 46 and 47 have cleared the upper edges of the frame members 23 and 24. During this forward movement, the forward edges of the flange member 46 engage the forward edges of the pair of crank arms 35 and 36, at their lower ends, causing the latter to rotate toward the truck, as viewed in Figure 1. The load supporting carriage 19 is then raised through the chains 18, by means of the hydraulic piston and cylinder assembly 20, until the upper edges of the frame members 23 and 24 engage the lower edges of the flange members 46 and 48, respectively, and the rear surfaces of the frame members 23 and 24 engage the tongue portions 47 and 49 of the flange members 46 and 48, respectively. When the flange members 46 and 48 have thus been positioned, the pair of crank arms 35 and 36 are caused to rotate back to their normal vertical position by means of the spring 40, with the lower ends of the crank arms 35 and 36 being disposed in engagement with the upper edges of the flange members 46. The load supporting means 43 is thus securely locked to the load supporting carriage 19 and the truck may be then utilized for engaging a load.

The load supporting means 43 may be released from engagement with the load supporting carriage 19 by the operator of the truck 10, while remaining in the operator's seat 7. The operator need only raise the outer end of the crank arm or foot lever 37 with his foot, which causes rotation of the shaft 34. Rotation of the shaft 34 causes the lower ends of the pair of crank arms 35 and 36 to rotate away from engagement with the upper edges of the flange members 46. The load supporting carriage 19 may then be lowered within the mast of the truck 10 until the tongue portions 47 and 49 of the flange members 46 and 48, respectively, are disengaged from contact with the rear surfaces of the frame members 23 and 24. The truck 10 may then be backed away.

While I have illustrated and described a specific form of load supporting means, it will be realized that the device of my present invention is adapted to lock other forms of load supporting or engaging devices to the load supporting carriage of an industrial truck.

While I have shown and described what I believe to be a preferred embodiment of my present invention, it will be understood that various rearrangements and modifications may be made therein without departing from the spirit and scope of my present invention.

I claim:

1. For use with an industrial truck having a substantially vertically movable load supporting carriage, the combination of a frame member adapted to be secured to the load supporting carriage transversely thereof, load supporting means including horizontal flange means adapted to be disposed in engagement with the upper edge of said frame member, a rotatable shaft vertically spaced above said frame member and carried by the latter, a crank arm fixed at one end to said shaft and at the other end being adapted to engage said flange means for locking the latter to said frame member, means carried by said frame member for rotating said shaft whereby said crank arm is disengaged from said flange means permitting said load supporting means to be freed from said frame member by an operator on the truck lowering the load supporting carriage until the load supporting means is disposed in engagement with the ground and then backing away the truck, and said means being manually operable by an operator seated on the truck.

2. For use with an industrial truck having an operator's seat, and a substantially vertically movable load supporting carriage, the combination of a frame member adapted to be secured to the load supporting carriage transversely thereof, load supporting means including horizontal flange means adapted to be disposed in engagement with the upper edge of said frame member, a rotatable shaft vertically spaced above said frame member and carried by the latter, a first crank arm fixed at one end to said shaft and at the other end being adapted to engage said flange means for locking the latter to said frame member, a second crank arm fixed at one end to said shaft and normally extending rearwardly therefrom toward the operator's seat, and said second crank arm at the other end thereof being adapted to be engaged by the foot of an operator seated on the truck for effecting rotation of the latter together with said shaft and said first crank arm whereby said first crank arm is disengaged from said flange means.

3. The combination of claim 2 characterized by the provision of means between said shaft and said frame member for normally biasing said first crank arm into engagement with said flange means.

4. For use with an industrial truck having an operator's seat and a substantially vertically movable load supporting carriage, the combination of a frame member adapted to be secured to the load supporting carriage transversely thereof, detachable load supporting means including horizontal flange means adapted to be disposed in engagement with the upper edge of said frame member, a rotatable shaft vertically spaced above said frame member and carried by the latter, a first normally downwardly extending crank arm fixed at one end to said shaft and at the other end being adapted to engage said flange means for locking the latter to said frame member, a second crank arm fixed at one end to said shaft and normally extending rearwardly therefrom toward the operator's seat, and said second crank arm at the other end thereof being adapted to be manually actuated by an operator on the truck for effecting rotation of said second crank arm together with said shaft and said first crank arm whereby said first crank arm is disengaged from said flange means permitting said load supporting means to be freed from said frame member by the operator on the truck lowering the load supporting carriage until the load supporting means is disposed in engagement with the ground and then backing away the truck.

5. For use with an industrial truck having an operator's seat and a substantially vertically movable load supporting carriage, the combination of a pair of vertically spaced frame members adapted to be secured to the load supporting carriage transversely thereof, detachable load supporting means including vertically spaced horizontal flange means engageable with the upper edges of said frame members, a rotatable shaft vertically spaced above the upper frame member and carried by the latter, a first normally downwardly extending crank arm fixed at one end to said shaft and at the other end being adapted to engage the upper flange means for locking the latter to the associated frame member, a second crank arm fixed at one end to said shaft and normally extending rearwardly therefrom toward the operator's seat, and said second crank arm at the other end thereof being adapted to be manually actuated by an operator on the truck for effecting rotation of said second crank arm together with said shaft and said first crank arm whereby said first crank arm is disengaged from said upper flange means permitting the flange means to be freed from said frame members by the operator on the truck lowering the load supporting carriage until the load supporting means is disposed in engagement with the ground and then backing away the truck.

DELANO WIGHT, JR.

References Cited in the file of this patent

UNITED STATES PATENTS

| Number | Name | Date |
|---|---|---|
| 2,157,612 | Kirk | May 9, 1939 |
| 2,286,992 | Murphy | June 16, 1942 |
| 2,368,122 | Dunham | Jan. 30, 1945 |
| 2,386,759 | Ulm | Oct. 16, 1945 |
| 2,421,472 | Way | June 3, 1947 |
| 2,441,750 | Britten | May 18, 1948 |
| 2,469,093 | White | May 3, 1949 |
| 2,483,745 | Vossenberg | Oct. 4, 1949 |
| 2,518,974 | Busenius | Aug. 15, 1950 |

FOREIGN PATENTS

| Number | Country | Date |
|---|---|---|
| 499,033 | Germany | May 30, 1930 |